(12) United States Patent
Fujita

(10) Patent No.: US 8,328,105 B2
(45) Date of Patent: Dec. 11, 2012

(54) SEMICONDUCTOR DEVICE

(75) Inventor: Masashi Fujita, Tokyo (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 311 days.

(21) Appl. No.: 12/732,863

(22) Filed: Mar. 26, 2010

(65) Prior Publication Data

US 2010/0243744 A1    Sep. 30, 2010

(30) Foreign Application Priority Data

Mar. 31, 2009 (JP) ................. 2009-086264

(51) Int. Cl.
*G06K 19/06* (2006.01)

(52) U.S. Cl. .................. 235/492; 235/486

(58) Field of Classification Search ............ 235/492, 235/493, 491, 486, 487, 383, 380, 382, 375
See application file for complete search history.

(56) References Cited

U.S. PATENT DOCUMENTS

| | | | |
|---|---|---|---|
| 6,321,067 B1 | 11/2001 | Suga et al. | |
| 6,580,370 B2* | 6/2003 | Fournel | 340/635 |
| 6,607,136 B1* | 8/2003 | Atsmon et al. | 235/492 |
| 7,907,902 B2* | 3/2011 | Kato et al. | 455/41.2 |
| 2008/0094180 A1 | 4/2008 | Kato et al. | |
| 2008/0245878 A1* | 10/2008 | Shiota et al. | 235/492 |
| 2011/0163613 A1* | 7/2011 | Kato et al. | 307/130 |

FOREIGN PATENT DOCUMENTS

| | | |
|---|---|---|
| JP | 10-145987 A | 5/1998 |
| JP | 11-345981 A | 12/1999 |

* cited by examiner

*Primary Examiner* — Thien M Le

(74) *Attorney, Agent, or Firm* — Fish & Richardson P.C.

(57) ABSTRACT

An object is to provide a semiconductor device which operates stably even when the communication distance between a reader/writer and a non-contact data carrier is largely changed. A protection circuit is provided in the non-contact data carrier, and an operating state and a non-operating state of the protection circuit are switched depending on the communication distance between the reader/writer and the non-contact data carrier. The operating point at which the operating state and the non-operating state of the protection circuit are switched is different between the case where input voltage of the protection circuit is low in an initial state and then gradually raised and the case where input voltage of the protection circuit is high in an initial state and then gradually lowered.

8 Claims, 6 Drawing Sheets

SEMICONDUCTOR DEVICE

BACKGROUND OF THE INVENTION

1. Field of the Invention

The technical field of the present invention relates to a semiconductor device which can transmit and receive data by wireless communication.

2. Description of the Related Art

In a wireless communication system using a radio frequency identification (RFID) technology, communication between a reader/writer and a non-contact data carrier is performed in such a manner that a carrier wave is transmitted from the reader/writer, electric power is supplied to the non-contact data carrier by electromagnetic induction, and the carrier wave is modulated.

The amount of electric power supplied from the reader/writer varies depending on the distance between an antenna of the reader/writer and an antenna of the non-contact data carrier. For example, when the non-contact data carrier and the reader/writer are in contact with each other, excessive electric power is supplied to an internal element of the non-contact data carrier. Accordingly, the non-contact data carrier cannot demodulate a signal from the reader/writer accurately, resulting in a problem of malfunction. In addition, there is a possibility that the internal element of the non-contact data carrier may deteriorate or be damaged.

As a countermeasure against such a problem, it is known that a protection circuit for protecting the internal element when excessive electric power is supplied to the non-contact data carrier is provided in the non-contact data carrier.

In Patent Document 1, an electric power transmission system and an IC card where electric power can be stably supplied even when the communication distance between a reader/writer and a non-contact data carrier is largely changed have been proposed.

REFERENCE

[Patent Document 1] Japanese Published Patent Application No. H10-145987

SUMMARY OF THE INVENTION

However, the operation of a protection circuit provided in a non-contact data carrier has an influence on a signal which is to be transmitted from the non-contact data carrier to a reader/writer. Therefore, there is a problem in that communication between the non-contact data carrier and the reader/writer is interfered.

In view of the foregoing problems, it is an object to provide a semiconductor device in which stable communication can be secured even when the communication distance between a reader/writer and a non-contact data carrier is largely changed.

In the semiconductor device, an operating state and a non-operating state of a protection circuit provided in the non-contact data carrier are switched depending on the communication distance between the reader/writer and the non-contact data carrier.

In other words, the point (operating point) at which an operating state and a non-operating state of the protection circuit are switched is different between the case where the level of input voltage of the protection circuit is low in an initial state and then gradually raised and the case where the level of input voltage of the protection circuit is high in an initial state and then gradually lowered.

By switching the operating state and the non-operating state of the protection circuit provided in the non-contact data carrier, stable communication can be secured even when the communication distance between the reader/writer and the non-contact data carrier is largely changed. In that case, the operating point of the protection circuit is changed depending on whether the level of input voltage of the protection circuit is gradually raised or gradually lowered, that is, the direction of change in the input voltage of the protection circuit; therefore, the protection circuit can operate stably.

Further, even when the communication distance between the reader/writer and the non-contact data carrier is extremely short, an internal element of the non-contact data carrier can be protected from excessive electric power supplied to the non-contact data carrier. Accordingly, the non-contact data carrier can have higher electric resistance to electric power. As a result, reliability of the non-contact data carrier can be improved.

The protection circuit provided in the non-contact data carrier is less likely to be adversely affected by slight fluctuation in voltage due to electric power instantaneously consumed by an internal circuit of the non-contact data carrier or the operation of a modulation circuit. Therefore, the operating state and the non-operating state of the protection circuit can be prevented from being meaninglessly switched. Accordingly, stable communication can be performed between the reader/writer and the non-contact data carrier.

DETAILED DESCRIPTION OF THE INVENTION

An embodiment of the present invention will be described in detail below with reference to drawings.

Embodiment

Figure 1:
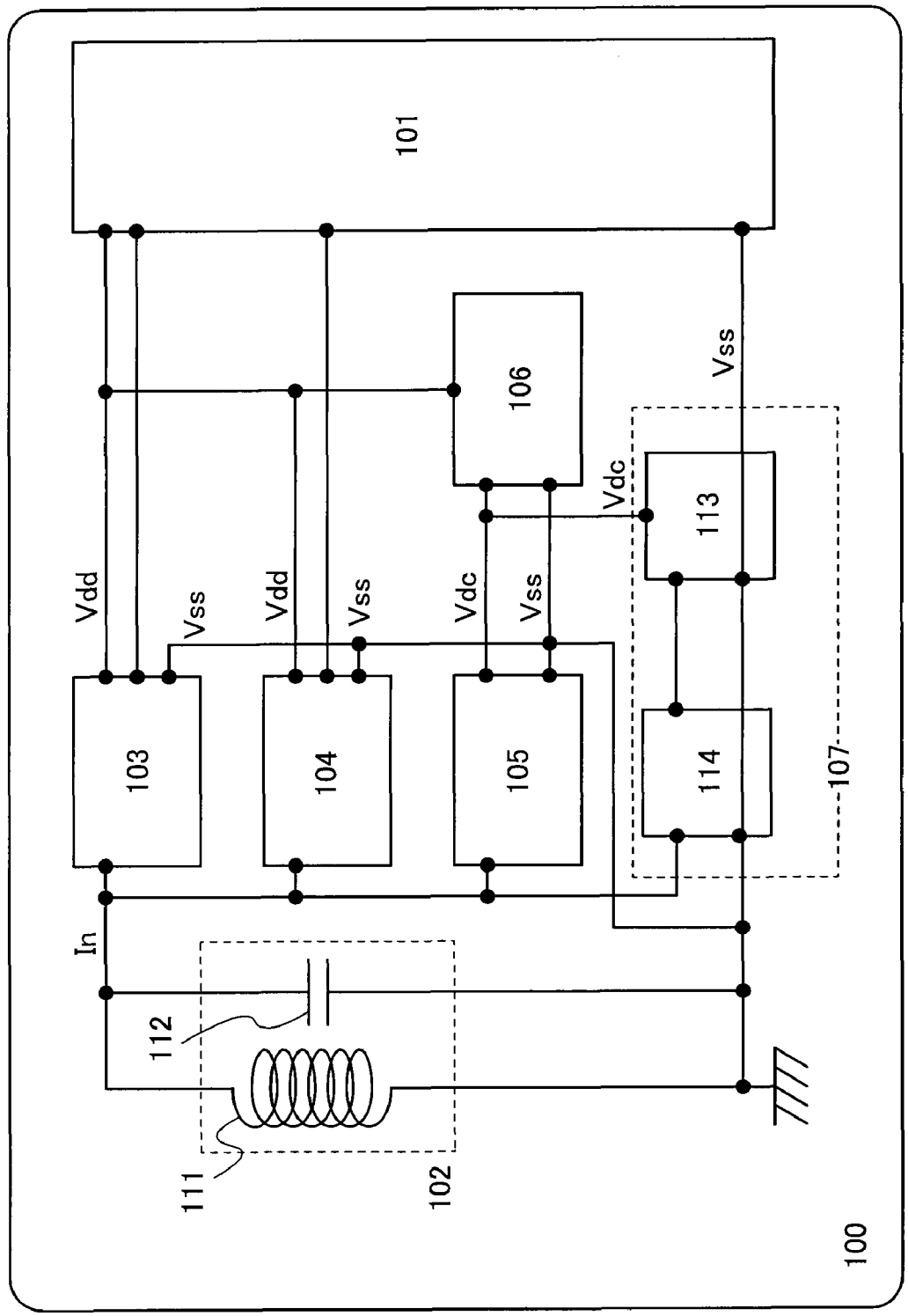
FIG. 1 is a block diagram of a whole non-contact data carrier.

First, a configuration of a whole non-contact data carrier is described with reference to FIG. 1. FIG. 1 is an example of a block diagram of the whole non-contact data carrier. A non-contact data carrier 100 includes a logic circuit 101, an antenna circuit 102, a demodulation circuit 103, a modulation circuit 104, a rectifier circuit 105, a constant voltage circuit 106, and a protection circuit 107.

The logic circuit 101 performs functional processing such as generation of a response signal on the basis of received data, for example.

The antenna circuit 102 transmits and receives signals to and from a reader/writer (not shown).

Here, the antenna circuit 102 includes an antenna 111 and a resonant capacitor 112. The antenna 111 has different capabilities of receiving a carrier wave from the reader/writer, depending on the shape or the number of windings of the antenna 111. The resonant capacitor 112 is provided in order to optimize resonant frequency of the antenna circuit 102 in accordance with a carrier wave from the reader/writer in combination with the antenna 111, the demodulation circuit 103, the modulation circuit 104, the rectifier circuit 105, and the protection circuit 107.

Note that the resonant frequency of the antenna circuit 102 can be optimized in accordance with a carrier wave from the reader/writer only by a combination of the antenna 111, the demodulation circuit 103, the modulation circuit 104, the rectifier circuit 105, and the protection circuit 107, without provision of the resonant capacitor 112.

The demodulation circuit 103 obtains a pulse signal by demodulation of an amplitude-modulated wave received in the antenna circuit 102 and inputs the pulse signal into the logic circuit 101.

Figure 2A:
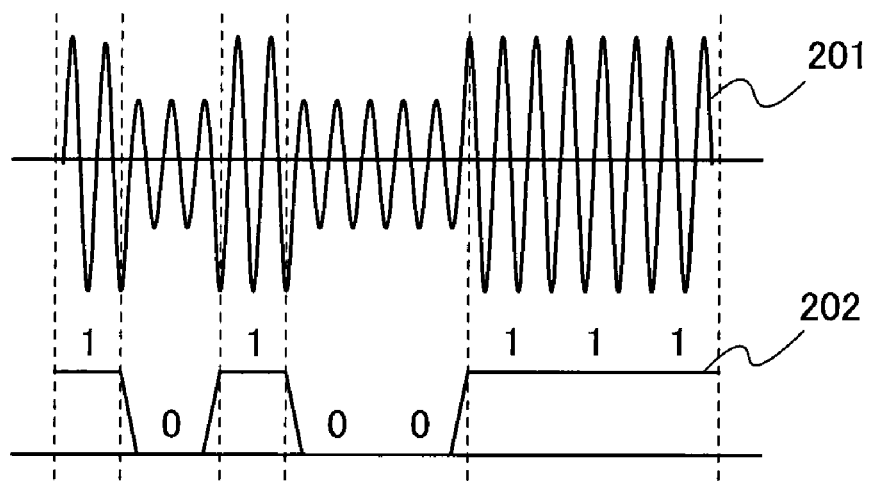
FIG. 2A is a graph showing a relation between an amplitude-modulated wave and a pulse signal.

FIG. 2A is a graph showing a relation between an amplitude-modulated wave 201 and a pulse signal 202. As shown in FIG. 2A, the amplitude-modulated wave 201 superimposes the pulse signal by amplitude modulation of a carrier wave. The demodulation circuit 103 obtains the pulse signal 202 by the amplitude modulation of the carrier wave.

The modulation circuit 104 modulates a carrier wave from the reader/writer in accordance with a response signal output from the logic circuit 101, and transmits the modulated carrier wave to the reader/writer.

The rectifier circuit 105 rectifies a carrier wave or an amplitude-modulated wave that is received in the antenna circuit 102 and generates DC voltage $V_{dc}$.

The constant voltage circuit 106 generates constant voltage from the DC voltage $V_{dc}$, and supplies the generated voltage as power supply voltage $V_{dd}$ to the logic circuit 101, the demodulation circuit 103, and the modulation circuit 104.

Figure 2B:
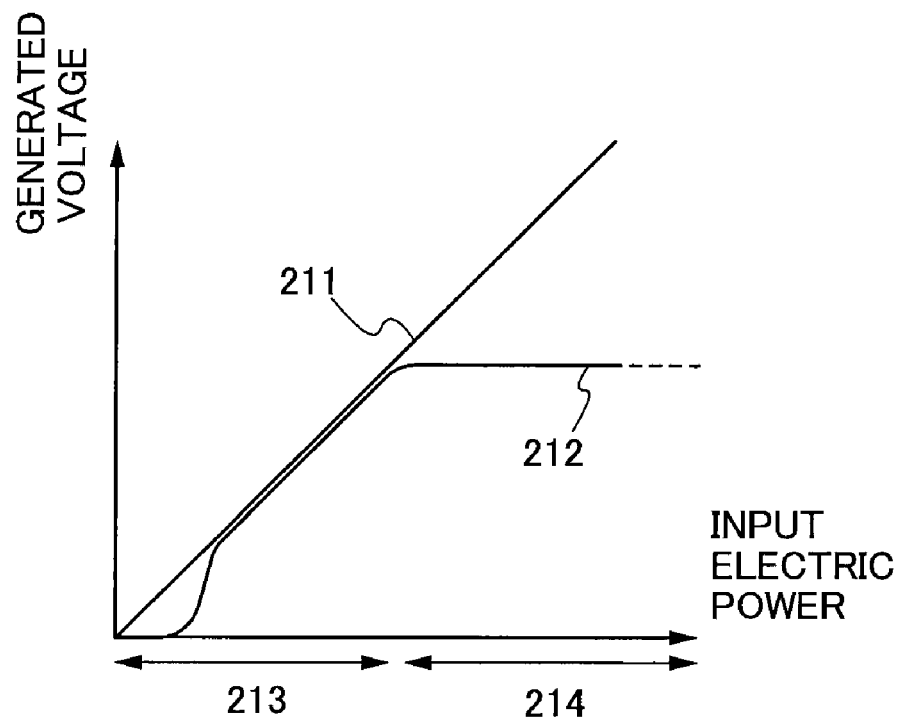
FIG. 2B is a graph showing a relation between DC voltage $V_{dc}$ and power supply voltage $V_{dd}$.

FIG. 2B is a graph showing a relation between DC voltage $V_{dc}$ 211 and power supply voltage $V_{dd}$ 212. As shown in FIG. 2B, in a region 213 where input electric power is low, the DC voltage $V_{dc}$ 211 is low and the constant voltage circuit 106 generates voltage so that the levels of the DC voltage $V_{dc}$ 211 and the power supply voltage $V_{dd}$ 212 are substantially equal to each other. In contrast, in a region 214 where the input electric power has reached certain electric power, as the frequency of a carrier wave or an amplitude-modulated wave that is received in the antenna circuit 102 is increased, the DC voltage $V_{dc}$ 211 is increased. However, the constant voltage circuit 106 supplies the constant power supply voltage $V_{dd}$ 212.

The protection circuit 107 includes a voltage detection circuit 113 and a switch 114 in order to prevent excessive voltage from being applied to an internal circuit. When the DC voltage $V_{dc}$ generated in the rectifier circuit 105 is higher than desired voltage, the voltage detection circuit 113 outputs a signal which turns the switch 114 on. When the DC voltage $V_{dc}$ is lower than the desired voltage, the voltage detection circuit 113 outputs a signal which turns the switch 114 off.

The non-contact data carrier 100 shown in FIG. 1 is employed when a carrier wave from the reader/writer is directly used as a clock signal CLK which is necessary for the operation of the logic circuit 101.

Figure 3:
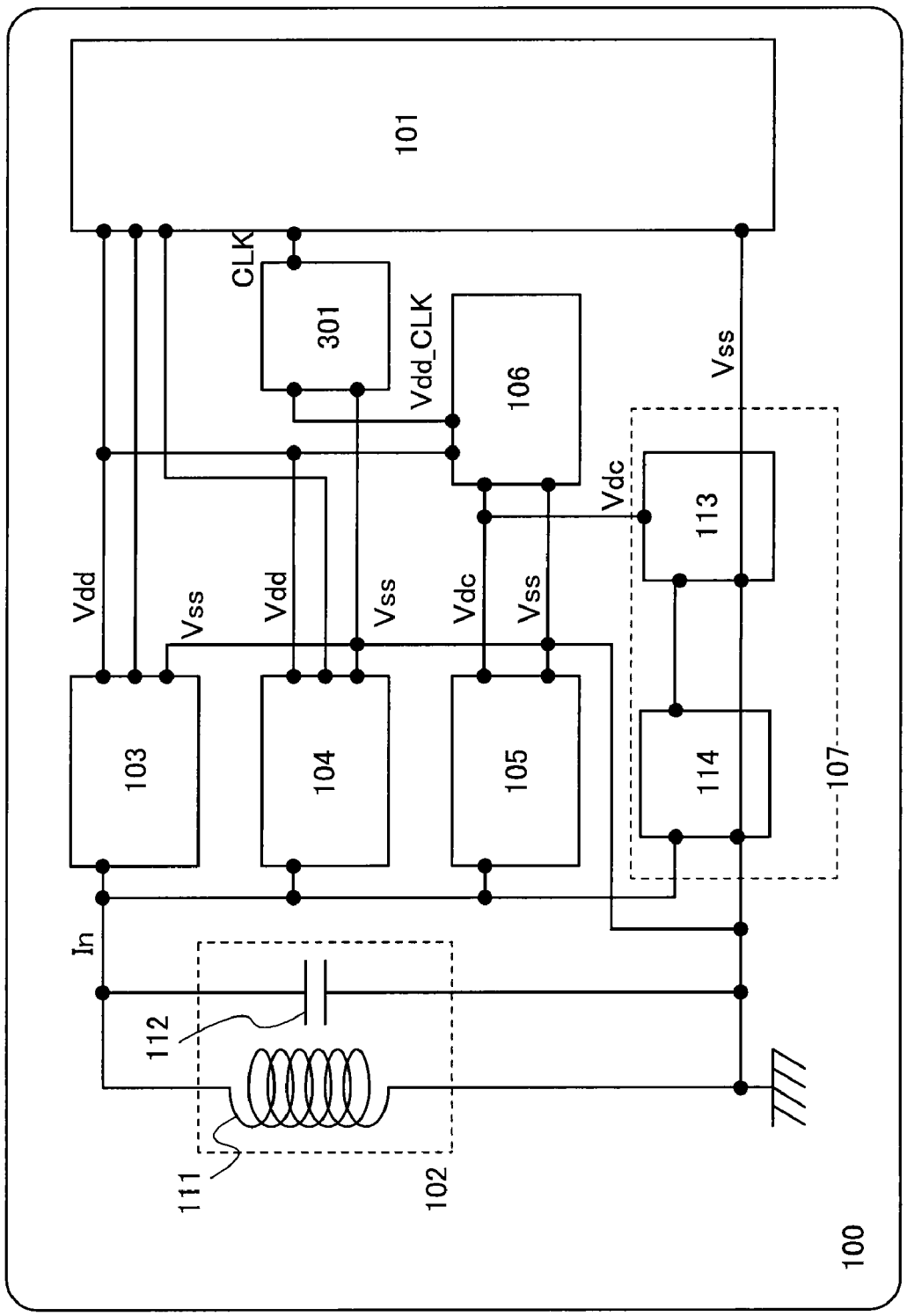
FIG. 3 is a block diagram in the case where a non-contact data carrier is provided with a clock generation circuit.

On the other hand, when the frequency of a carrier wave from the reader/writer is lower than the operating frequency of the logic circuit 101 or higher than several hundreds of megahertz, the carrier wave cannot be directly used as the clock signal CLK. In this case, the non-contact data carrier 100 includes a clock generation circuit 301 as shown in FIG. 3.

In order that the clock generation circuit 301 may supply the clock signal CLK having constant frequency stably to the logic circuit 101, power supply voltage $V_{dd\_CLK}$ supplied to the clock generation circuit 301 needs to be stable. The power supply voltage $V_{dd\_CLK}$ is generated in the constant voltage circuit 106 separately from the power supply voltage $V_{dd}$ which is supplied to a different circuit.

Power supply voltage supplied to the clock generation circuit 301 may be the same as the power supply voltage $V_{dd}$ which is supplied to the different circuit. In that case, however, there is a possibility that voltage supplied to the clock generation circuit 301 may fluctuate due to current consumed by the different circuit.

Figure 4:
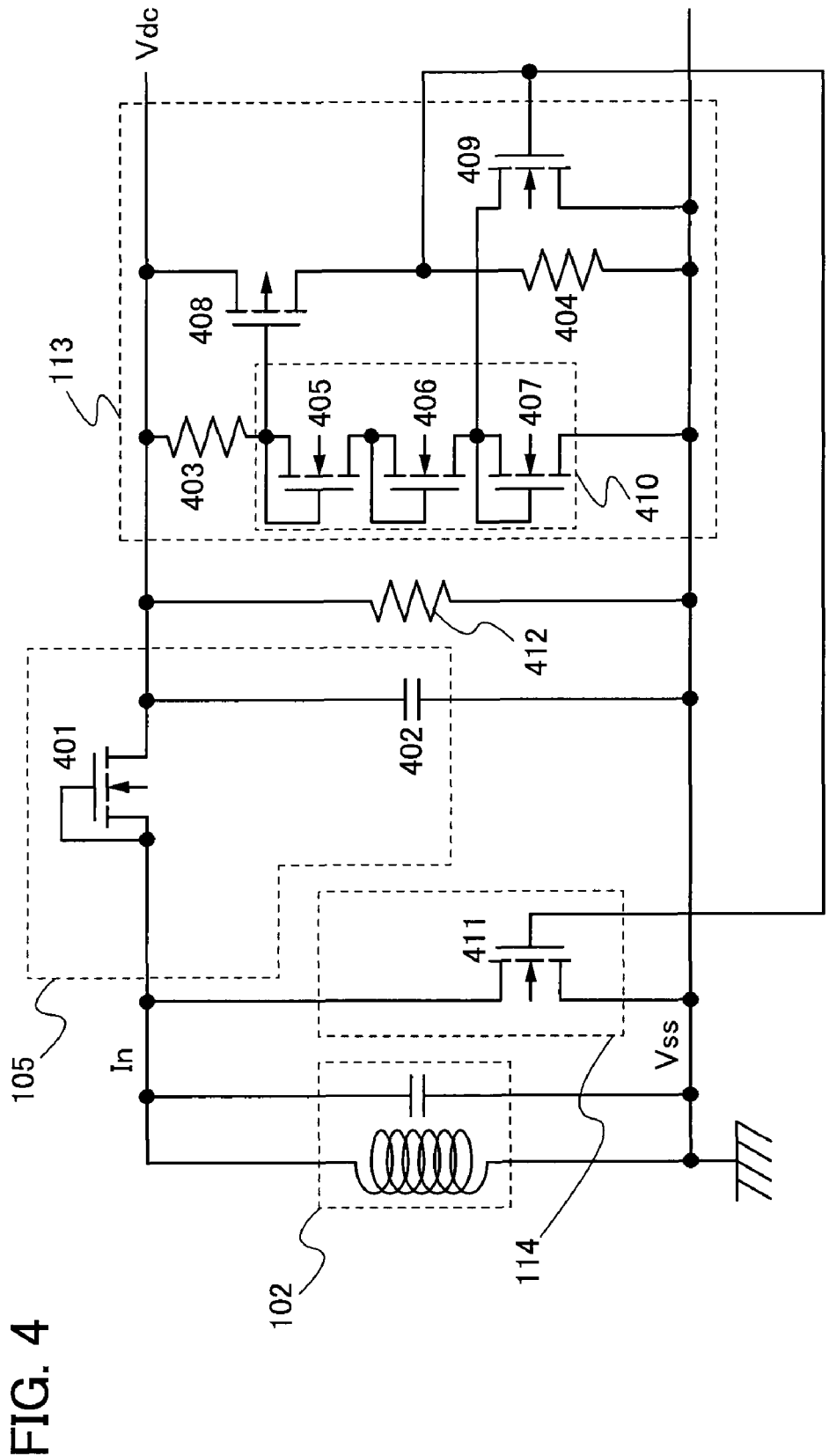
FIG. 4 shows examples of circuit configurations of a rectifier circuit 105 and a protection circuit 107.

Next, a configuration and operation of the protection circuit 107 are described with reference to FIG. 4. FIG. 4 shows examples of circuit configurations of the rectifier circuit 105 and the protection circuit 107 in FIG. 1.

Note that in the circuit of FIG. 4, both an n-channel transistor and a p-channel transistor are used. Hereinafter, an on state and an off state of each transistor are expressed as "higher than the threshold voltage" and "lower than the threshold voltage," respectively. Unless otherwise specified, the expression "higher than the threshold voltage" means that the absolute value of gate-source voltage is higher than the absolute value of the threshold voltage. In contrast, the expression "lower than the threshold voltage" means that the absolute value of the gate-source voltage is lower than the absolute value of the threshold voltage.

The rectifier circuit 105 includes a diode-connected transistor 401 and a capacitor 402. In FIG. 4, the transistor 401 and the capacitor 402 form a half-wave rectifier circuit.

Figure 5:
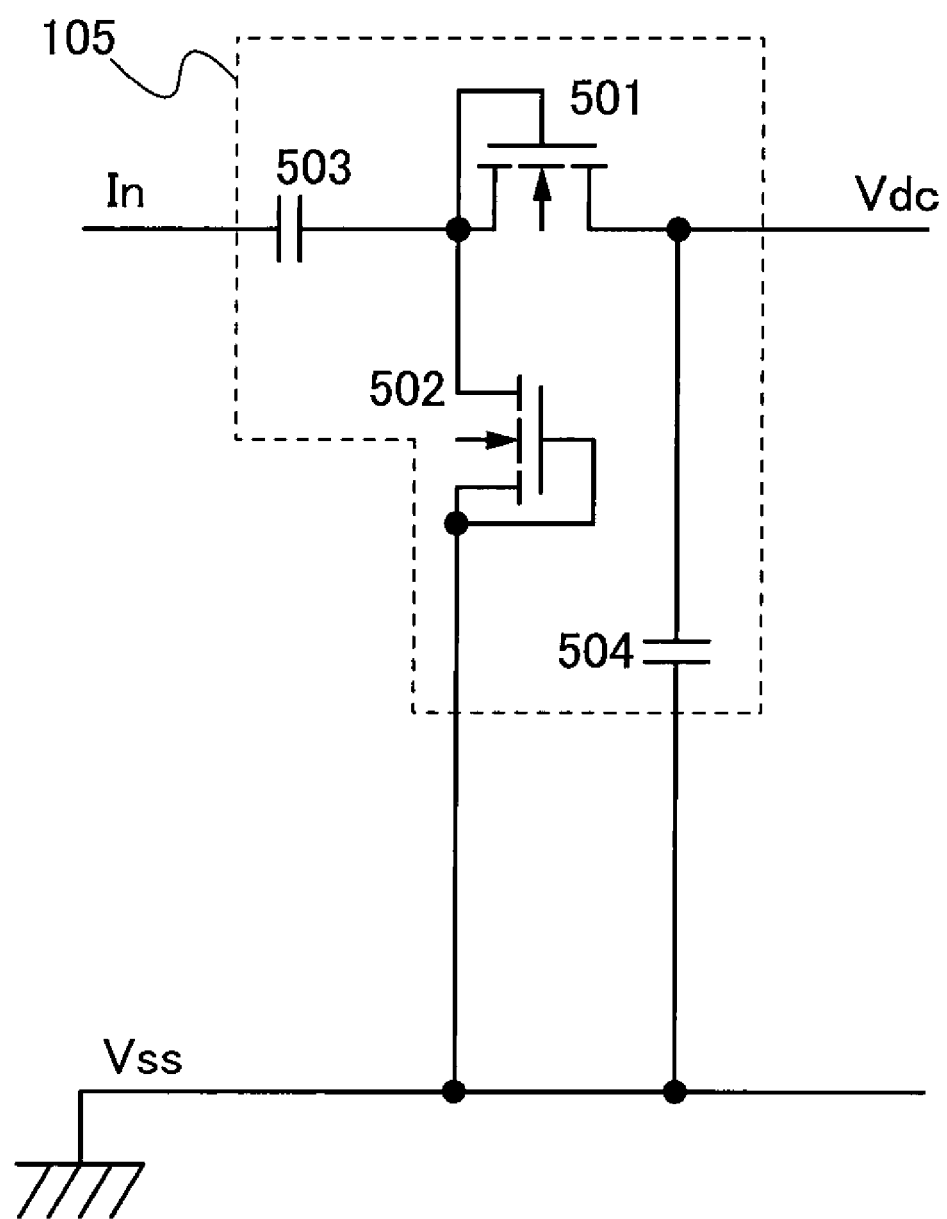
FIG. 5 shows another example of a circuit configuration of the rectifier circuit 105.

Note that the configuration of the rectifier circuit 105 is not limited to the configuration shown in FIG. 4. FIG. 5 shows another example of the circuit configuration of the rectifier circuit 105. In FIG. 5, the rectifier circuit 105 includes diode-connected transistors 501 and 502 and capacitors 503 and 504, and has a configuration in which two stages of half-wave rectifier circuits are connected in series.

In this manner, as the circuit configuration of the rectifier circuit 105, a configuration in which N (N is an integer of 1 or more) stages of half-wave rectifier circuits are connected in series can be employed. The increase in the number of stages enables generation of higher DC voltage $V_{dc}$ and the increase in communication distance; however, current supply capability is reduced. Therefore, an optimal circuit configuration needs to be selected in accordance with current consumed by a circuit of a stage subsequent to the rectifier circuit 105.

In FIG. 4, the voltage detection circuit 113 includes resistors 403 and 404 and transistors 405, 406, 407, 408, and 409. The transistors 405, 406, and 407 in a region 410 are diode-connected transistors.

The number of transistors M in the region 410 can be any number as long as M is an integer of 1 or more. By adjustment of the number of transistors M in the region 410, voltage at which the protection circuit 107 operates (operating point) can be controlled. The voltage at which the protection circuit 107 operates is adjusted in accordance with the withstand voltage of an element included in the non-contact data carrier 100, whereby the element can be prevented from deteriorating or being damaged.

The switch 114 includes a transistor 411.

One end of the antenna circuit 102 is electrically connected to one of a source and a drain of the transistor 411. The other end of the antenna circuit 102 is electrically connected to the other of the source and the drain of the transistor 411.

Operation of the protection circuit 107 is described below.

When the antenna circuit 102 receives a carrier wave transmitted from the reader/writer, AC voltage is induced by electromagnetic induction. Then, the rectifier circuit 105 generates the DC voltage $V_{dc}$ from the induced AC voltage. The capacitor 402 is a smoothing capacitor, holds the generated DC voltage $V_{dc}$, and smoothes a ripple and noise.

A resistor 412 is a pull-down resistor. The resistor 412 may be included in the rectifier circuit 105. The resistor 412 is provided to make the level of the DC voltage $V_{dc}$ equal to the level of power supply voltage $V_{ss}$ (=GND) when the antenna circuit 102 does not receive a carrier wave, that is, when the DC voltage $V_{dc}$ is not generated in the rectifier circuit 105. Note that the reference potential GND is not limited to 0 V and may be a potential to be a reference of the circuit.

The generated DC voltage $V_{dc}$ is monitored by the voltage detection circuit 113. Monitoring refers to extraction of a potential divided by the resistance of the resistor 403 and the combined resistance of the transistors 405, 406, and 407 in the region 410 and the transistor 409. An output from the voltage detection circuit 113 is input into a gate of the transistor 411 included in the switch 114.

Operation of the protection circuit 107 when the DC voltage $V_{dc}$ is low in an initial state and then gradually raised is described. In the initial state, the DC voltage $V_{dc}$ is low and gate-source voltage of each of the transistors 405, 406, and 407 in the region 410 is lower than the threshold voltage thereof; therefore, the transistors 405, 406, and 407 are turned off. In addition, since a gate potential of the transistor 408 is substantially equal to the DC voltage $V_{dc}$, the transistor 408 is also turned off.

In this case, an output from the voltage detection circuit 113 is substantially equal to the power supply voltage $V_{ss}$. Therefore, a gate potential of the transistor 409 is substantially equal to the power supply voltage $V_{ss}$ and the transistor 409 is also turned off.

Then, when the DC voltage $V_{dc}$ is gradually raised, the gate-source voltage of each of the transistors 405, 406, and 407 in the region 410 is higher than the threshold voltage thereof thus, the transistors 405, 406, and 407 are turned on.

In this case, an output from the voltage detection circuit 113 is a potential divided by the transistor 408 and the resistor 404 in accordance with impedance change between the source and the drain of the transistor 408.

When an output potential from the voltage detection circuit 113 is raised, a gate potential of the transistor 411 is also raised. When the gate-source voltage of the transistor 411 is higher than the threshold voltage thereof, the transistor 411 is turned on. When the transistor 411 turned on, current flows through the transistor 411 and voltage applied to the transistor 401 in the rectifier circuit 105 is lowered.

When the output potential from the voltage detection circuit 113 is further raised and the gate-source voltage of the transistor 409 is higher than the threshold voltage thereof, the transistor 409 is turned on. When the transistor 409 is turned on, the combined resistance of the transistors 405, 406, and 407 in the region 410 and the transistor 409 is lowered. Accordingly, the gate potential of the transistor 408 is lowered, and the potential divided by the transistor 408 and the resistor 404 is raised.

Change in voltage when the protection circuit 107 operates in the above manner is described with reference to FIGS. 6A and 6B.

Figure 6A:
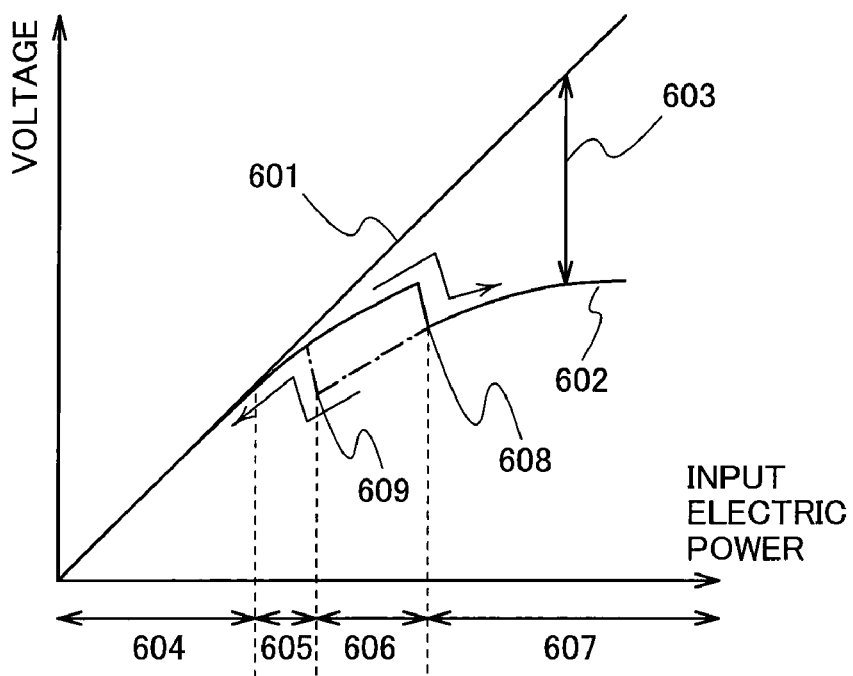
FIG. 6A schematically shows a relation between DC voltage $V_{dc}$ and a gate potential of a transistor 408, and FIG. 6B schematically shows a relation between DC voltage $V_{dc}$ and a gate voltage of a transistor 411 in a switch 114.

FIG. 6A schematically shows a relation between DC voltage $V_{dc}$ 601 in the voltage detection circuit 113 and a gate potential 602 of the transistor 408. Note that the solid line represents the gate potential 602 when the DC voltage $V_{dc}$ is low in an initial state and then gradually raised. In FIG. 6A, the vertical axis represents voltage and the horizontal axis represents the level of input electric power. A potential difference 603 corresponds to gate-source voltage of the transistor 408.

In FIG. 6A, the transistors 405, 406, and 407 in the region 410 are off in a region 604 where the input electric power is low. Therefore, the gate potential 602 of the transistor 408 is substantially equal to the DC voltage $V_{dc}$ 601, and the transistor 408 is off.

In regions 605 and 606 where the input electric power is high, the transistors 405, 406, and 407 in the region 410 are turned on. Therefore, the potential difference 603 is gradually generated and the transistor 408 is turned on.

In a region 607 where the input electric voltage is higher, the DC voltage $V_{dc}$ is further raised and the transistor 409 is turned on. Therefore, the gate potential 602 of the transistor 408 is drastically changed (at an operating point 608).

After that, the potential difference 603 is increased as the DC voltage $V_{dc}$ is raised.

Figure 6B:
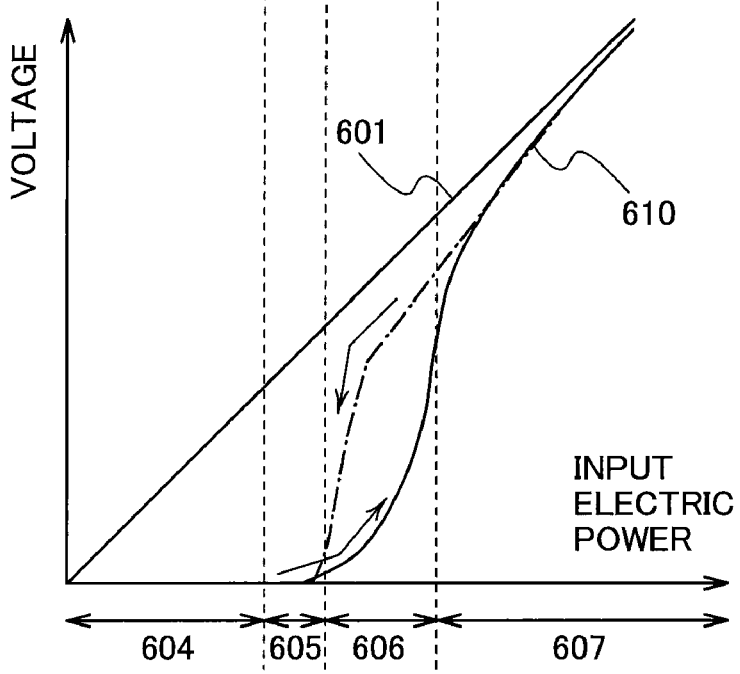

FIG. 6B schematically shows a relation between the DC voltage $V_{dc}$ 601 in the voltage detection circuit 113 and a gate potential 610 of the transistor 411 included in the switch 114. Note that the solid line represents the gate potential 610 when the DC voltage $V_{dc}$ is low in an initial state and then gradually raised. In FIG. 6B, the vertical axis represents voltage and the horizontal axis represents the level of input electric power.

In FIG. 6B, the transistor 408 is off in the region 604 where the input electric power is low. Therefore, a drain potential of the transistor 408 is substantially equal to the power supply voltage $V_{ss}$ and the transistor 411 is off.

In the regions 605 and 606 where the input electric power is high, the transistor 408 is turned on. As the drain potential of the transistor 408 is raised, the gate potential 610 of the transistor 411 also begins to be raised.

When the gate-source voltage of the transistor 411 is higher than the threshold voltage thereof and the transistor 411 is turned on, impedance between the source and the drain of the transistor 411 is changed. In the regions 605 and 606, since the transistor 411 operates in a saturation region, the impedance is greatly changed in accordance with change in the gate-source voltage.

In the region 607 where the input electric power is higher, the gate-source voltage of the transistor 411 is raised, and the transistor 411 operates in a linear region. In the region 607, the transistor 411 is completely on and the protection circuit 107 fully functions.

Through the above operation, when the DC voltage $V_{dc}$ is excessively raised, the protection circuit 107 operates and voltage applied to the rectifier circuit 105 is controlled.

Next, operation of the protection circuit 107 when the DC voltage $V_{dc}$ is high in an initial state and then gradually lowered is described. Since the DC voltage $V_{dc}$ is high in the initial state, the gate-source voltage of each of the transistors 405, 406, and 407 in the region 410 is higher than the threshold voltage thereof thus, the transistors are turned on. Further, the gate-source voltage of the transistor 409 is higher than the threshold voltage thereof; therefore, the transistor 409 is also turned on.

When the transistor 409 is turned on, the combined resistance of the transistors 405, 406, and 407 in the region 410 and the transistor 409 is low as compared to the case where the transistor 409 is off and the transistors 405, 406, and 407 in the region 410 are on. Accordingly, when the transistor 409 is on, the potential divided by the resistance of the resistor 403 and the combined resistance of the transistors 405, 406, and 407 in the region 410 and the transistor 409 is low as compared to the case where the transistor 409 is off.

The gate-source voltage of the transistor 408 is higher than the threshold voltage thereof, so that the transistor 408 is turned on. In the case where the same level of DC voltage $V_{dc}$ is applied, the gate-source voltage of the transistor 408 is high when the transistor 409 is on as compared to the case where the transistor 409 is off.

Accordingly, an output from the voltage detection circuit 113 is a potential divided by the transistor 408 and the resistor 404 in accordance with the impedance change between the source and the drain of the transistor 408. In the case where the same level of DC voltage $V_{dc}$ is applied, that potential is high when the transistor 409 is on as compared to the case where the transistor 409 is off.

The output potential from the voltage detection circuit 113 is higher than the threshold voltage of the transistor 411 in the switch 114, so that the transistor 411 is turned on. When the transistor 411 is turned on, current flows through the transistor 411 and voltage applied to the transistor 401 in the rectifier circuit 105 is lowered.

Change in voltage when the protection circuit 107 operates in the above manner is described with reference to FIGS. 6A and 6B.

In FIG. 6A, the dot-dash line represents the gate potential 602 when the DC voltage $V_{dc}$ is high in an initial state and then gradually lowered. The transistors 405, 406, and 407 in the region 410 are on in the region 607 where the input electric power is high. In addition, the transistors 408 and 409 are also on.

Even in the region 606 where the input electric power is gradually lowered, the transistor 409 is kept on. Therefore, the potential difference 603 is still higher than the threshold voltage of the transistor 408, and the transistor 408 is also kept on.

In the region 605 where the input electric power is further lowered, the transistor 409 is turned off. Therefore, the potential difference 603 is drastically lowered at an operating point 609.

In the region 604 where the input electric power is further lowered, the potential difference 603 is not generated and the transistor 408 is turned off.

In FIG. 6B, the dot-dash line represents the gate potential 610 when the DC voltage $V_{dc}$ is high in an initial state and then gradually lowered. In the region 607 where the input electric power is high, the drain potential of the transistor 408 is higher than the threshold voltage of the transistor 409. Therefore, both of the transistors 408 and 409 are on. The drain potential of the transistor 408 is close to the DC voltage $V_{dc}$, and the transistor 411 is on.

Even in the region 606 where the input electric power is gradually lowered, the drain potential of the transistor 408 is higher than the threshold voltage of the transistor 409; therefore, the transistor 409 is on. Also in the region 606, the drain potential of the transistor 408 is substantially equal to the DC voltage $V_{dc}$, so that the transistor 411 is on.

In the region 605 where the input electric power is further lowered, the drain potential of the transistor 408 is lower than the threshold voltage of the transistor 409, so that the transistor 409 is turned off. The gate-source voltage of the transistor 408 is also lowered drastically, and the drain potential of the transistor 408 is lowered.

In the region 604 where the input electric power is further lowered, the potential difference 603 is not generated, so that the transistor 408 is turned off. The drain potential of the transistor 408 is substantially equal to the power supply voltage $V_{ss}$, so that the transistor 411 is turned off.

Through the above operation, when the level of the DC voltage $V_{dc}$ is lower than or equal to a predetermined level, the protection circuit 107 does not operate and voltage applied to the rectifier circuit 105 is not controlled.

As described above, the operating point of the protection circuit 107 is changed depending on the direction of change in the DC voltage $V_{dc}$. In the case where the DC voltage $V_{dc}$ is low in an initial state and then gradually raised, the operating point of the protection circuit 107 is high as compared to the case where the DC voltage $V_{dc}$ is high in the initial state and then gradually lowered.

By provision of a difference between voltage at which the protection circuit 107 starts operating and voltage at which the protection circuit 107 stops operating, a difference is made between rising and falling characteristics of output voltage of the protection circuit 107. Accordingly, meaningless switching of the operating state and the non-operating state of the protection circuit 107, due to fluctuation in voltage around the voltage at which the operating state and the non-operating state of the protection circuit 107 is switched can be suppressed and stable operation can be performed.

Thus, the transistor 411 is not repeatedly turned on/off frequently by slight increase and decrease in potential of the DC voltage $V_{dc}$, which is caused by current instantaneously consumed by the internal circuit of the non-contact data carrier or operation of the modulation circuit. Therefore, the operation of the protection circuit 107 is stabilized.

Stable operation of the protection circuit 107 can suppress adverse effects on a transmission signal that is transmitted to the reader/writer to the minimum, which greatly contributes to improvement in stability of wireless communication.

Note that it is easily understood by those skilled in the art that the above circuit configuration can be changed as appropriate in accordance with the polarity of a transistor, magnitude relation between power supply voltages, or the like.

This application is based on Japanese Patent Application serial no. 2009-086264 filed with Japan Patent Office on Mar. 31, 2009, the entire contents of which are hereby incorporated by reference.

What is claimed is:

1. A semiconductor device comprising:
   an antenna;
   a first transistor, wherein a drain and a gate of the first transistor is electrically connected to one end of the antenna;
   a first resistor, wherein one end of the first resistor is electrically connected to a source of the first transistor;
   a second transistor, wherein one of a source and a drain of the second transistor is electrically connected to the one end of the first resistor, and a gate of the second transistor is electrically connected the other end of the first resistor;
   a second resistor, wherein one end of the second resistor is electrically connected to the other of the source and the drain of the second transistor;
   one or a plurality of third transistors, wherein a drain and a gate of any one of the one or the plurality of third transistors is electrically connected to the other end of the first resistor;
   a fourth transistor, wherein a gate of the fourth transistor is electrically connected to the one end of the second resistor and the other of the source and the drain of the second transistor; and
   a fifth transistor, wherein a gate of the fifth transistor is electrically connected to the gate of the fourth transistor, and one of a source and a drain of the fifth transistor is electrically connected to the drain and the gate of the first transistor, wherein the other end of the antenna, a source of the one or the plurality of third transistors, the other end of the second resistor, the other of the source and the drain of the fourth transistor, and the other of the source and the drain of the fifth transistor are grounded.

2. The semiconductor device according to claim 1, wherein the plurality of third transistors are connected in series.

3. The semiconductor device according to claim 2, wherein the drain and the gate of any one of the plurality of third transistors are electrically connected to one of the source and the drain of the fourth transistor.

4. The semiconductor device according to claim 1, further comprising a third resistor, wherein one end of the third resistor is electrically connected to the source of the first transistor, and the other end of the third resistor is grounded.

5. A non-contact data carrier comprising the semiconductor device according to claim 1.

6. A non-contact data carrier the semiconductor device according to claim 1, wherein the first resistor, the second transistor, the one or the plurality of third transistors, and the fourth transistor are included in a protection circuit.

7. A non-contact data carrier comprising:
an antenna circuit comprising an antenna;
a logic circuit;
a demodulation circuit;
a modulation circuit;
a protection circuit; and
a rectifier circuit,
wherein a first operating point at which an operating state and a non-operating state of the protection circuit are switched in the case where the level of input voltage of the protection circuit is low in an initial state and then gradually raised is different from a second operating point at which an operating state and a non-operating state of the protection circuit in the case where the level of input voltage of the protection circuit is high in an initial state and then gradually lowered, and wherein the protection circuit comprises:
a first resistor, wherein one end of the first resistor is electrically connected to the rectifier circuit;
a first transistor, wherein one of a source and a drain of the first transistor is electrically connected to the one end of the first resistor, and a gate of the first transistor is electrically connected the other end of the first resistor;
a second resistor, wherein one end of the second resistor is electrically connected to the other of the source and the drain of the first transistor;
one or a plurality of second transistors, wherein a drain and a gate of any one of the one or the plurality of second transistors is electrically connected to the other end of the first resistor; and
a third transistor, wherein a gate of the third transistor is electrically connected to the one end of the second resistor and the other of the source and the drain of the first transistor.

8. The non-contact data carrier according to claim 7, wherein the rectifier circuit comprises a fourth transistor, wherein a drain and a gate of the fourth transistor is electrically connected to one end of the antenna.

* * * * *